INVENTOR
JOSEPH K. MANN
BY Robert W. Dilts
ATTORNEY

INVENTOR
JOSEPH K. MANN
BY Robert W Dilts
ATTORNEY

Oct. 7, 1969 J. K. MANN 3,471,810

HIGH POWER MICROWAVE MATCHING STRUCTURE EMPLOYING TWO SETS OF CUMULATIVELY REINFORCING SPACED WAVE REFLECTIVE ELEMENTS

Filed Nov. 14, 1966 3 Sheets-Sheet 3

INVENTOR.
JOSEPH K. MANN
BY Robert W. Witts
ATTORNEY

United States Patent Office 3,471,810

Patented Oct. 7, 1969

3,471,810

HIGH POWER MICROWAVE MATCHING STRUCTURE EMPLOYING TWO SETS OF CUMULATIVELY REINFORCING SPACED WAVE REFLECTIVE ELEMENTS

Joseph K. Mann, Palo Alto, Calif., assignor to Varian Associates, Palo Alto, Calif., a corporation of California Filed Nov. 14, 1966, Ser. No. 593,770
Int. Cl. H03h 7/38
U.S. Cl. 333—33 9 Claims

ABSTRACT OF THE DISCLOSURE

An improved impedance matching structure is disclosed employing two sets of at least three wave reflective elements spaced apart along a transmission line by certain predetermined spacings such that the relatively small wave reflections from each of the reflective elements cumulatively reinforce each other to cancel the wave reflection from a structure to be matched or to introduce a desired mismatch, whereby a desired wave reflection is obtained without any of the individual reflective elements producing a discontinuity in the transmission line of sufficient amplitude to produce arcing or overheating thereof at high power levels. Such improved matching structures are especially useful for, but not limited in use to, matching to wave reflective devices, such as microwave windows, under test in megawatt power level waveguide ring resonators.

Figure 1:
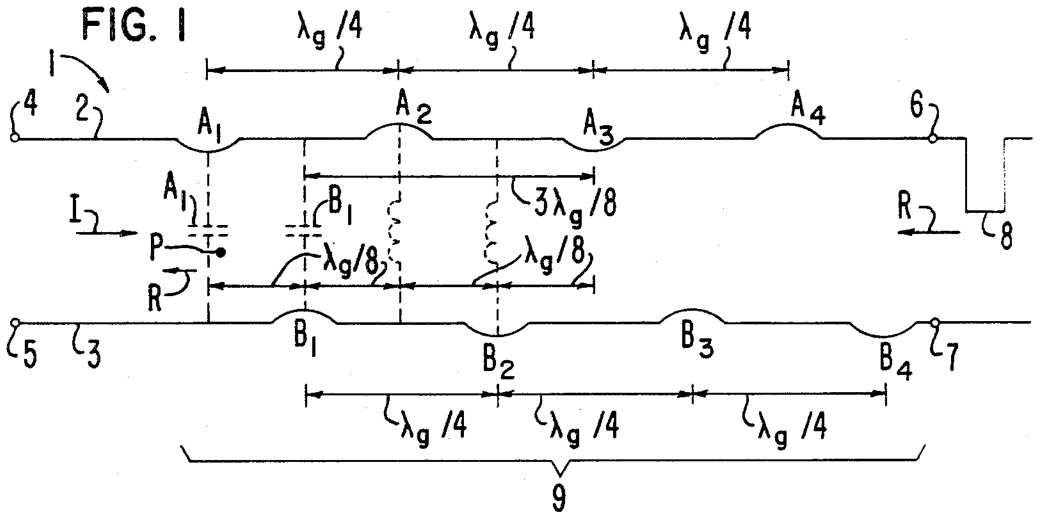

Heretofore plural wave reflective elements spaced by certain predetermined distances along a transmission line have been employed to produce a cumulative wave reflection in the transmission line which cancels the wave reflection from a wave reflective device to be matched. Examples of such devices are double and triple stub and slug tuners. The problem with these devices is that each of the tuners produced a relatively large reflective discontinuity in the transmission line which makes them unsuited for high power applications where such large discontinuities can produce overheating of the dielectric medium or breakdown in components of the transmission line, thereby producing a catastrophic failure of certain microwave components of the system.

In the present invention, two sets of wave reflecting elements are spaced apart along the transmission line with each element producing a relatively small wave reflection, which may be adjustable in amplitude and sign. The wave reflecting elements of the first set are spaced apart along the transmission line by an integral number of quarter wavelengths to produce a cumulative wave reflection of a first phase. The wave reflecting elements of the second set are spaced apart along the transmission line by an integral number of quarter wavelengths and spaced from the first set by an integral number of eighth wavelengths to produce a second cumulative wave reflection in quadrature with the first cumulative wave reflection. Thus, by adjusting the relative amplitudes and signs of the first and second cumulative wave reflections, a total compensating wave reflection of any arbitrary magnitude and phase can be produced in the transmission line for canceling the wave reflection from a wave reflective device to be matched or for generating an adjustable standing wave in the line.

In a preferred embodiment of the present invention, the reflective elements comprise movable conductive diaphragms forming portions of the wall structure of a hollow transmission line. The diaphragms are smooth and introduce no sharp corners which would otherwise produce high localized field strengths. Two tuning structures are provided, one for separately moving each set of the diaphragms in concert, whereby adjustments of the two separate tuning structures permit adjustment of the magnitude and phase of the total compensating wave reflection. The diaphragms eliminate the sliding or moving radio frequency contacts as used in the prior art, permit the hollow transmission line to be pressurized, and individually produce relatively small wave reflections, thereby permitting the matching structure to operate to very high power levels without breakdown or failure.

The principal object of the present invention is the provision of an improved matching structure for high power microwave transmission lines.

One feature of the present invention is the provision of a first and second set of wave reflective elements spaced along a transmission line, one set of elements producing a wave reflective component in phase quadrature with that produced by the other set of elements, whereby through relative adjustments of the wave components produced by each set of elements a total compensating wave reflection is produced to cancel a wave reflection from a wave reflective device to be matched.

Another feature of the present invention is the same as the preceding feature wherein one set of wave reflective elements is spaced along the transmission line by an odd number of eighth guide wavelengths from the other set of elements, whereby the phase quadrature relationship of their respective reflective wave components is obtained.

Another feature of the present invention is the same as any one or more of the preceding features wherein the wave reflective elements of each set are spaced apart along the transmission line by an integral number of quarter wavelength, whereby the wave reflection from the elements of each set cumulatively reinforce each other, and whereby the individual wave reflections can be but a small fraction of the wave reflection to be canceled.

Another feature of the present invention is the same as any one or more of the preceding features wherein the wave reflective elements of each set are arranged to produce a wave reflection of like sign (inductive or capacitive) and are spaced apart along the transmission line by an integral number of half wavelengths.

Another feature of the present invention is the provision of a set of wave reflective elements spaced apart along the transmission line by an odd number of quarter wavelengths from each other with adjacent elements producing a wave reflection of opposite sign such that the wave reflections from the set of elements mutually reinforce one another at a fixed position in the transmission line.

Another feature of the present invention is the same as any one or more of the preceding features wherein the transmission line is a hollow wave supporting structure and the wave reflecting elements are conductive diaphragms closing over bores in the side wall of the hollow wave structure, whereby such diaphragms produce relatively small wave reflections which are readily adjustable in magnitude and sign, and permit the hollow structure to be pressurized or evacuated.

Another feature of the present invention is the same as any one or more of the preceding features including a pair of gang tuning means for adjusting one set wave reflective elements relative to the other, whereby the phase and magnitude of the total compensating wave reflection is adjusted for canceling the wave reflection to be matched.

Figure 3:
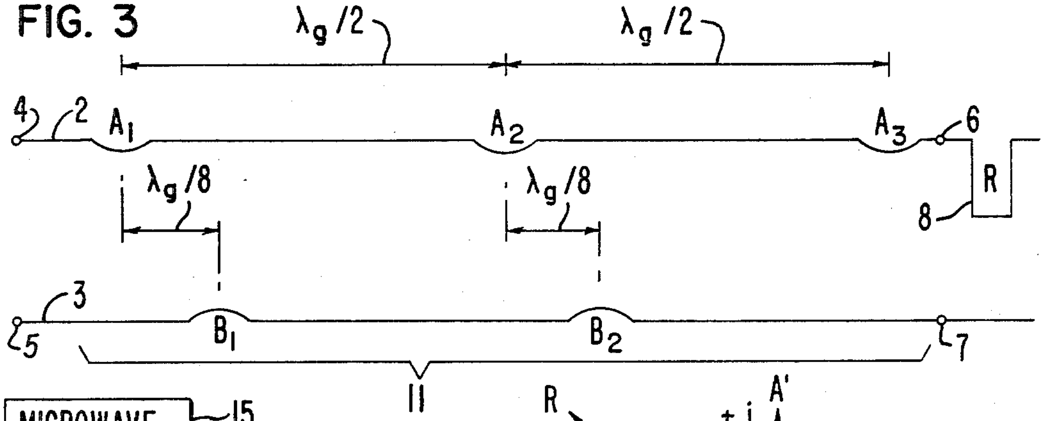
Figure 4:
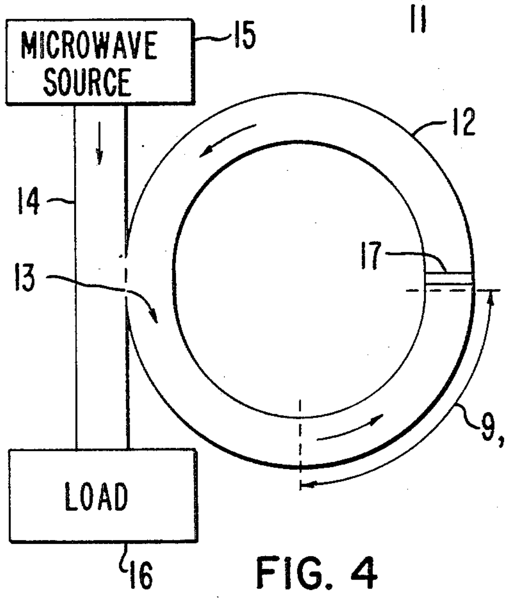
Figure 2:
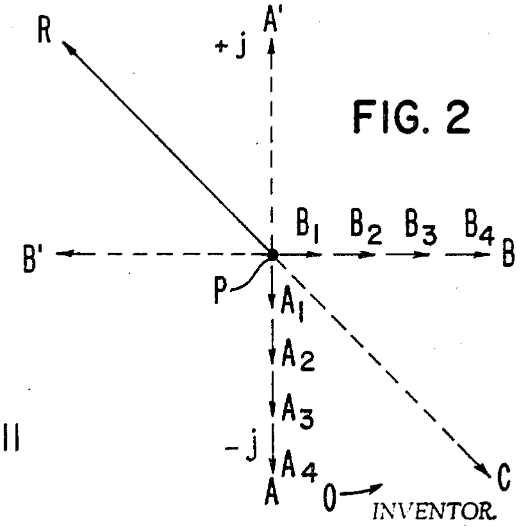
Figure 5:
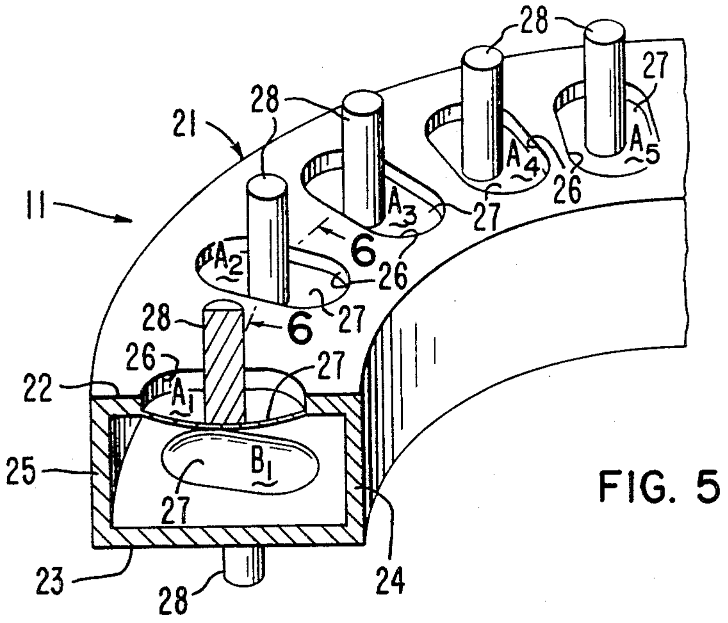
Figure 6:
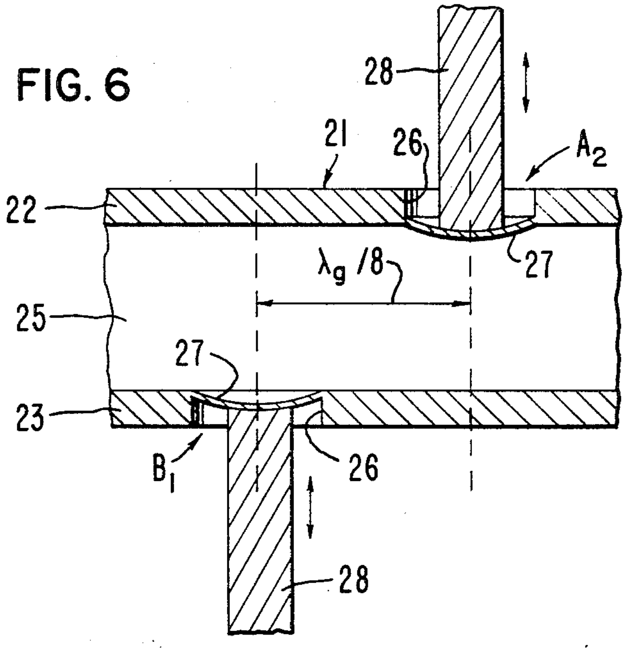
Figure 7:
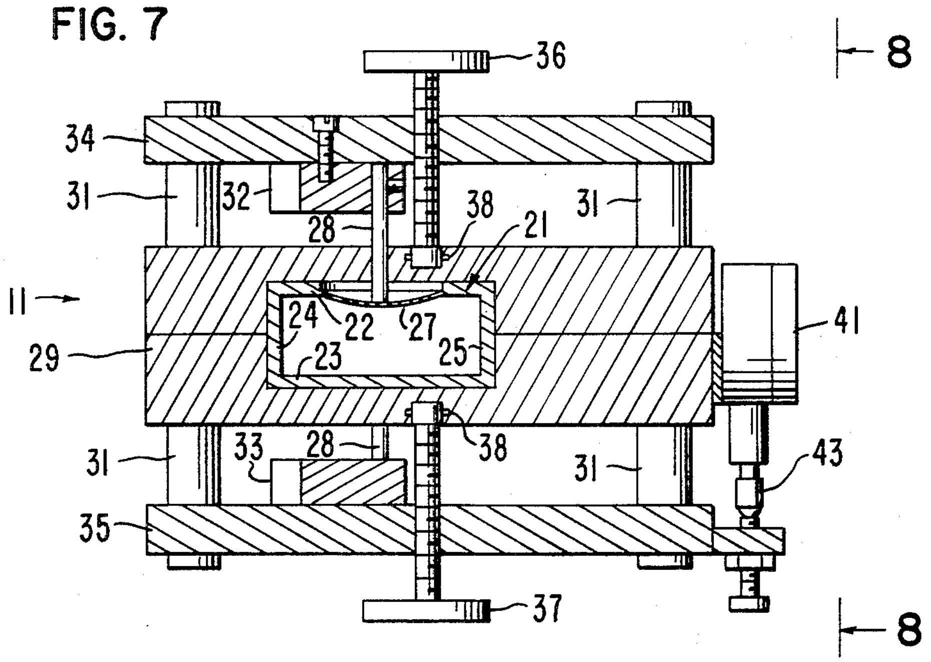
Figure 8:
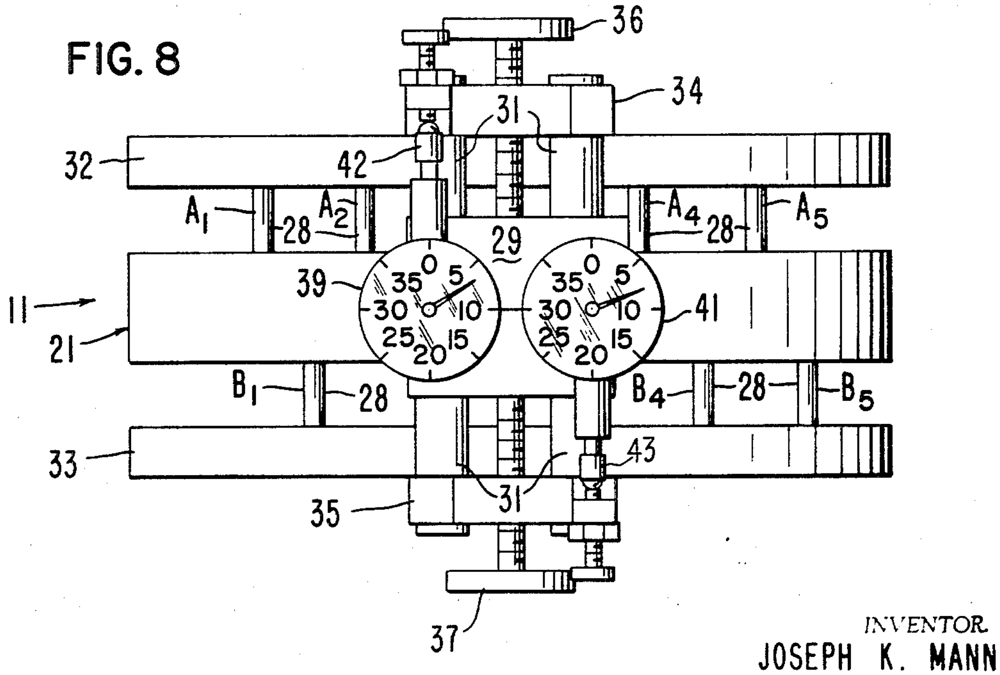

Other features and advantages of the present invention will become apparent upon a perusal of the following specification taken in connection with the accompanying drawings wherein:

FIGURE 1 is a schematic line diagram of a transmission line incorporating the impedance matching structure of the present invention, FIGURE 2 is a phasor diagram depicting the electrical operation of the structure of FIGURE 1, FIGURE 3 is a schematic line diagram of an alternative embodiment of the present invention, FIGURE 4 is a schematic line diagram, partly in block diagram form, of a microwave resonant ring structure incorporating the matching structure of the present invention, FIGURE 5 is a perspective view of a rectangular waveguide incorporating features of the present invention, FIGURE 6 is an enlarged sectional view of a portion of the structure of FIGURE 5 taken along line 6—6 in the direction of the arrows, FIGURE 7 is a transverse sectional view of a waveguide matching structure of the present invention, and FIGURE 8 in a view of the structure of FIGURE 7 taken along line 8—8 in the direction of the arrows.

Referring now to FIGURE 1 there is shown a transmission line 1 incorporating the impedance matching structure of the present invention. More particularly, the transmission line 1 comprises a pair of parallel conductors 2 and 3 with a pair of input terminals 4 and 5 and a pair of output terminals 6 and 7. The output end of the transmission line is connected to a microwave reflective device 8 which produces a reflected wave R. The reflected wave sets up a standing wave in the transmission line 1. At any given point in the transmission line, such as for example point P, the reflected wave will have a certain amplitude and phase relation. It is assumed that the reflected wave is represented by the vector R of FIGURE 2.

A microwave matching structure 9 is incorporated in the transmission line to produce a compensating wave reflection C which is equal in magnitude and 180° out of phase with the reflected wave R for canceling the reflected wave and, thus, producing a "flat" transmission line having no standing waves thereon. The matching structure 9 comprises two sets of wave reflective elements, set A and set B.

The individual wave reflective elements $A_1, A_2 \ldots A_n$, and $B_1, B_2 \ldots B_n$ of each set are spaced apart along the direction of the transmission line 1 such that the wave reflections from individual ones of the reflecting elements cumulatively reinforces the wave reflections from the other elements in the same set. Moreover, the elements of one set are spaced from the elements of the other set such that the total reflected wave of one set is in phase quadrature with the total reflected wave from the other set. Thus, by adjusting the sign and magnitude of the two reflected waves a combined total wave is obtainable having any desired magnitude, and phase for cancelling the reflected wave R to produce a matched or flat transmission line 1.

The wave reflecting elements can produce a wave reflection of one sign or of the opposite sign, i.e., 180° phase difference, depending upon whether the reflective element is a capacitive discontinuity or an inductive discontinuity in the transmission line 1. The inwardly directed reflective elements $A_1$, $A_3$, $B_1$, and $B_3$ produce a capacitive type reflection, whereas outwardly directed elements $A_2$, $A_4$, $B_2$, and $B_4$ produce an inductive type reflection.

In order to get constructive reinforcement of the waves reflected from the elements of one set, the elements are spaced apart by an integral number *n* of quarter guide wavelengths along the direction of the transmission line 1. If the reflective elements are of alternating type, i.e., alternating capacitive and inductive, as shown in FIGURE 1, the reflected waves will constructively or cumulatively reinforce if spaced apart by any odd number of quarter guide wavelengths. Thus, $\lambda g/4$ is a suitable spacing. However, if adjacent wave reflective elements are of the same type, either capacitive or inductive, the spacing for constructive reinforcement of the reflected waves is any even number of quarter guide wavelengths. Thus, $\lambda g/2$ is a suitable spacing in this case.

In order to obtain phase quadrature between the cumulative reflected wave of one set of reflective elements and the cumulative reflected wave of the second set of reflective elements, the reflective elements of the two sets are spaced apart by an odd number of eighth guide wavelengths.

Referring now to FIGURE 2 there is shown a phasor diagram for depicting the electrical operation of the matching structure 9 of FIGURE 1. It is assumed for the sake of explanation, that the wave R reflected from the component 8 to be matched has a phasor R at point P, as depicted in FIGURE 2. The input wave I, when partially reflected from capacitive reflective element A, produces a reflected phasor $A_1$. Using $A_1$ as a reference the input wave advances an eighth of a wavelength, is capacitively reflected by reflector $B_1$, and then is reflected back to point P, advancing another eighth of a wavelength to produce phasor $B_1$. Again, using phasor $A_1$ as a reference, the input wave I advances by a quarter wavelength to reflector $A_2$ at which point it is reflected with 180° phase shift because this is an inductive reflector and then the $A_2$ reflected wave advances by another quarter wavelength to produce phasor $A_2$ at point P. Following through with this analysis of the operation, it is seen that all the A reflectors produce reflected waves that constructively reinforce at point P and all the B reflectors produce reflected waves that reinforce at point P to produce a wave B in phase quadrature with the wave A from the A reflectors. The combination of the A wave and the B wave is a resultant wave C which is equal and opposite to the reflected wave R, thereby canceling same and matching the reflective device 8 to produce a flat transmission line.

By reversing the sign of all the A reflective elements, the A wave phasor is shifted to $+j$ position as indicated by A′. By reversing the sign of all the B set of wave reflective elements, the B wave is shifted by 180° to a position as indicated by B′.

The magnitude of the A and B waves is determined by the sum of their individual reflected wave components. Thus, by increasing or decreasing the size of all the reflective discontinuities of each set the magnitude of waves A and B are separately adjustable. By relative adjustment of the sign and magnitude of the reflected wave components A and B, a total combined compensating wave of any phase and magnitude is obtainable for canceling the reflection from any reflective device.

In the embodiment of FIGURE 1, where the wave reflective elements of each set are spaced by $\lambda g/4$, adjacent reflective elements of each set are of the opposite sign (capacitive and inductive) this makes it more difficult to gang all the elements of each set for the adjustment because, in order to increase the total reflected wave A or B, adjacent elements $A_1, A_2 \ldots$ etc., are moved in opposite directions. However, by deleting every other reflective element in each set of elements and using only the even or odd numbered elements $A_1, A_3 \ldots B_1, B_3 \ldots$ etc. all the elements of each set can be moved in the same direction, thereby simplifying the gang tuning mechanism.

Referring now to FIGURE 3 there is shown such a simplified matching structure 11. In this case, the reflective elements $A_1, A_2, A_3 \ldots$ etc. and $B_1, B_2 \ldots$ etc. of each set are spaced by an even number of quarter guide wavelengths along the transmission line 1.

As regards bandwidth of the matching structure of the present invention, the greater the number of reflective elements in each set the narrower the operating bandwidth. For a set containing 5 reflective elements and designed to cancel relatively large reflections, the operating bandwidth is approximately 50%. The band edges correspond to a condition wherein there is a net 180° phase departure from the condition of reinforcement between the reflected wave from the first reflective element and the wave reflected from the last element of the set. Actually more useful bandwidth is obtainable if relatively small total waves A or B can be used. Thus, relatively large departures from precise quarter wave spacings between elements can be tolerated. Therefore, the spacings need only be approximately an integral number of quarter guide wavelengths at the center frequency of the pass band of the matching structure, where "approximately" means ±25% for a 5 element set and less than ±25% for sets containing more than 5 elements and more than ±25% for set contining less than 5 elements.

Referring now to FIGURE 4 there is shown a typical microwave system incorporating the matching structure 9 or 11 of the present invention. More particularly, a microwave waveguide traveling wave ring resonator 12 is fed with microwave power via a directional coupler 13 and waveguide 14 from a microwave source 15. A load 16 is connected to the end of the waveguide 14 for absorbing wave energy not coupled into the ring resonator 12.

Such a system is typically employed for testing microwave components, such as a microwave window 17, which is placed in the ring resonator 12. The ring resonator 12 stores the power applied thereto and permits building up of power levels therein which are on the order of 20 db above the power level of the microwave source 15. Thus, a 20 kilowatt CW microwave source can be employed to build up the power level in the ring resonator to 1 mw. CW. However, if there is any uncanceled wave reflection in the ring resonator, such as that produced by the device 17 under test, then this mismatch, which in ordinary transmission line produces only a very small reflected wave, can in the ring resonator produce a very large reflected wave, particularly if the ring resonator has high gain. Furthermore, the mismatched ring prevents transfer of power to the ring, thereby preventing attainment of the desired high power levels therein.

Therefore, the ring resonator structure must be matched to a very high degree and, of course, the matching structure employed must be capable of operating at the very high power levels of the ring resonator. Accordingly, the waveguide embodiments of the matching structures 9 or 11 of FIGURES 1 and 3 are employed to advantage in the ring resonator 12 of FIGURE 4.

Referring now to FIGURES 5–8 there is shown the matching structure 11 of FIGURE 3 as embodied in a section of rectangular waveguide for use in the ring resonator structure 12 of FIGURE 4. FIGURES 5 and 6 show an H bend elbow section of rectangular waveguide H with the two sets of wave reflective elements $A_1$, $A_2$ . . . etc. and $B_1$, $B_2$ . . . etc. FIGURES 7 and 8 show the gang tuning and indicating structure associated with the waveguide of FIGURES 5 and 6.

The waveguide 21 comprises a pair of broad side walls 22 and 23 and a pair of narrow side walls 24 and 25. The top and bottom side walls are each provided with a set of inwardly directed oval bores 26 spaced apart along the waveguide by one half a guide wavelength. The bores 26 are terminated short of intersection with the interior of the waveguide 21 to leave a thin deformable oval diaphragm 27. A plurality of actuating rods 28 are brazed to the outside wall of the diaphragms 27 for deflecting same.

Referring now to FIGURES 7 and 8 the gang tuning structure is shown in greater detail. A rectangular metallic block 29 is affixed around the central portion of the waveguide 21. Four guide rods 31 are fixedly secured to and pass through the corners of the block 29 and extend above and below the waveguide 21. A pair of arc-shaped ganging bars 32 and 33 extend along the waveguide 21 on opposite sides thereof and are affixed to the actuating rods 28, as by pins, for moving all of the actuating rods of each set A or B in concert. The ganging bars 32 and 33 are each affixed, as by screws, to carriage members 34 and 35, which slide on the guide rods 31. The carriage members are centrally bored and tapped to threadably mate with a pair of drive screws 36 and 37 which screws are captured against axial translation as by retaining rings 38.

A pair of micrometer indicating dials 39 and 41 are carried from the block 29 and their feeler rods 42 and 43 bear against the carriage members 34 and 35, respectively. The indicating dials 39 and 41 indicate the relative deflections of the reflective elements $A_1$, $A_2$ . . . etc., and $B_1$, $B_2$ . . . etc. of the two sets of wave reflective elements.

In operation, rotation of the A or B set drive screw 36 and 37, respectively, causes the carriage members 34 and 35 to move and change the magnitude of the individual wave reflections from the respective set of wave reflecting elements. Also as the deflection of the diaphragms passes through the non-deflected condition the sign of the reflected wave shifts by 180°, as previously described. Thus, by rotation of screws 36 and 37 any desired phase and magnitude of combined reflective wave C is obtained for canceling any arbitrary reflected wave R in the transmission line containing the matching structure 11 of FIGURES 5–8. Also, if desired, the structure 11 may be employed for setting up standing waves in the transmission of any phase and magnitude.

An apparatus as shown in FIGURES 5–8 was built and tested as a matching structure in a traveling wave ring resonator system of the type depicted in FIGURE 4. The matching structure 11 had 5 reflective diaphragm elements in each set A and B. The waveguide was operated at about 8 gHz. at a power level of 1.25 mw. CW with a pressure fill of $SF_6$ at 40 p.s.i. No arcing or overheating of the matching structure was observed.

The provision of two sets of wave reflective elements for matching or creating any arbitrary standing wave in a microwave transmission line is applicable in general to any kind of microwave transmission line including but not limited to coaxial lines, circular waveguide, rectangular waveguide, strip line, etc. The individual wave reflecting elements need not be diaphragms but may be plugs, screws, or the like. However, diaphragms are preferred for high power applications since they involve no moving contacts and are not likely to produce an excessively large reflection which could cause a breakdown of the transmission line at high power levels.

As used herein the various guide wavelength spacings are determined for the center frequency of the pass band for which the matching structure is designed to operate.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave matching structure for high power transmission lines including, means forming a section of microwave transmission line, means forming a first set of at least three wave reflective elements in wave energy communication with said section of transmission line with adjacent ones of said first wave reflective elements being spaced apart along said transmission line by approximately an integral number of quarter guide wavelengths therein and the wave reflections from individual ones of said first wave reflective elements being of such sign that they cumulatively reinforce each other in said section of at least three transmission lines, means forming a second set of wave reflecting elements in wave energy communication with said section of transmission line with adjacent ones of said second wave reflective elements being spaced apart along said transmission line by approximately an integral number of quarter guide wavelengths therein and the wave reflections from individual ones of said second wave reflective elements being of such sign that they cumulatively reinforce each other in said section of transmission line, and said wave reflective elements of said second set being spaced along the guide from said wave reflective elements of said first set by approximately an odd integral number of eighth guide wavelengths, whereby the cumulative wave reflections of said first and second sets of wave reflective elements are in phase quadrature such that by relative adjustment of said first and second sets of wave reflective elements the phase and magnitude of their combined wave reflection is adjustable.

2. The apparatus of claim 1 wherein said second set of wave reflective elements are interposed with respect to said first set of wave reflective elements in a coextensive length of said transmission line, whereby the over-all length of the matching structure is minimized.

3. The apparatus of claim 1 wherein adjacent ones of said wave reflective elements of said first set of wave reflecting elements are dimensioned to produce wave reflections of opposite sign and are spaced apart along said transmission line by approximately an integral number of odd quarter guide wavelengths.

4. The apparatus of claim 1 wherein adjacent ones of said wave reflective elements of said first set are dimensioned to produce wave reflections of the same sign and are spaced apart along said transmission line by approximately an even number of integral quarter guide wavelengths, whereby a like adjustment of each reflective element produces a cumulative change in the total wave reflection from said first set.

5. The apparatus of claim 1 wherein said transmission line includes a hollow conductor for confining the microwave energy therewithin, and wherein said wave reflective elements comprise deflectable side wall portions of said hollow conductor, whereby deflection of said side wall portions inwardly of said hollow conductor produces a wave reflection of one sign and outward deflection of said side wall portions produces a wave reflection of opposite sign.

6. The apparatus of claim 5 including means forming a first gang tuner structure operative upon said first set of deflectable side wall portions for deflecting said side wall portions in concert, whereby the cumulative wave reflection from said first set of wave reflecting elements is adjustable.

7. The apparatus of claim 6 including means forming a second gang tuning structure operative upon said second set of deflectable side wall portions for deflecting said side wall portions in concert, whereby the cumulative wave reflection from said second set of wave reflecting elements is adjustable.

8. The apparatus of claim 5 wherein said hollow conductor is a rectangular waveguide having a pair of mutually opposed broad side walls and a pair of mutually opposed narrow side walls, and wherein said first set of said deflectable side wall portions is located in a first of said broad side walls and said second set of said deflectable side wall portions is located in a second of said broad side walls.

9. The apparatus of claim 8 including in combination, means forming a ring resonator structure, means forming a microwave device in said ring resonator producing a wave reflection to be canceled, and the microwave matching structure forming a portion of said ring resonator structure, whereby the total wave reflection from said first and second sets of deflectable side wall portions serves to cancel said wave reflection to be canceled.

References Cited

UNITED STATES PATENTS 2,897,460 7/1959 La Rosa ------------- 333—33

HERMAN K. SAALBACH, Primary Examiner

T. VEZEAU, Assistant Examiner

U.S. Cl. X.R.

333—98